US010494039B2

(12) United States Patent
Young et al.

(10) Patent No.: US 10,494,039 B2
(45) Date of Patent: Dec. 3, 2019

(54) MULTIPLE DEGREE OF FREEDOM CAB SUSPENSION SYSTEM

(71) Applicant: Deere & Company, Moline, IL (US)

(72) Inventors: Donald E. Young, Cedar Falls, IA (US); Joshua J. Kappelman, Cedar Falls, IA (US); Jade E. Bender, Waterloo, IA (US); Wen Tsung Lin, Evansdale, IA (US); Byron N. Manternach, Dunkerton, IA (US)

(73) Assignee: DEERE & COMPANY, Moline, IL (US)

( * ) Notice: Subject to any disclaimer, the term of this patent is extended or adjusted under 35 U.S.C. 154(b) by 56 days.

(21) Appl. No.: 15/850,148

(22) Filed: Dec. 21, 2017

(65) Prior Publication Data

US 2019/0193795 A1 Jun. 27, 2019

(51) Int. Cl.
*B62D 33/06* (2006.01)
*B62D 24/04* (2006.01)
*B62D 27/04* (2006.01)

(52) U.S. Cl.
CPC ......... *B62D 33/0604* (2013.01); *B62D 24/04* (2013.01); *B62D 27/04* (2013.01)

(58) Field of Classification Search
CPC ........ B62D 24/04; B62D 27/04; B62D 33/06; B62D 33/0604; B62D 33/0608; B62D 33/0617; E02F 9/166

USPC ..................................... 296/190.01, 190.07
See application file for complete search history.

(56) References Cited

U.S. PATENT DOCUMENTS

| | | | |
|---|---|---|---|
| 6,758,294 B2* | 7/2004 | Peddycord | B62D 33/0604 180/89.12 |
| 7,744,149 B2* | 6/2010 | Murray | B62D 33/0608 180/89.13 |
| 8,807,633 B2 | 8/2014 | Milburn et al. | |
| 9,487,249 B2 | 11/2016 | Scott et al. | |
| 2011/0057478 A1* | 3/2011 | Van der Knaap | B60G 99/008 296/190.07 |
| 2011/0079457 A1* | 4/2011 | Virtanen | B62D 33/0608 180/89.12 |

* cited by examiner

*Primary Examiner* — Jason S Daniels
(74) *Attorney, Agent, or Firm* — Klintworth & Rozenblat IP LLP (57) ABSTRACT

A suspension system for controlling multiple degrees of freedom of a cab of a vehicle has mounting pads that support the cab with a spring assembly connected between the chassis and each mounting pad, allowing the cab to move with multiple degrees of freedom. A lateral rod connects with one of the mounting pads, with the chassis, and restricts sideways motion of the cab. A longitudinal rod connects with one of the mounting pads, with the chassis, and restricts forward motion of the cab. A stabilizer bar connects with one of the front mounting pads, one of the rear mounting pads, the chassis structure, and controls forward pitch rate of the cab. A roll control bar connects with the rear mounting pads and the chassis structure, and controls lateral roll rate of the cab.

19 Claims, 4 Drawing Sheets

MULTIPLE DEGREE OF FREEDOM CAB SUSPENSION SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to suspension systems for cabs of vehicles, and more particularly, to cab suspension systems with multiple degrees of freedom for work vehicles.

BACKGROUND OF THE DISCLOSURE

Work vehicles such as tractors are built to withstand rugged conditions and as a result, the ride quality for an operator may be characterized by motion and vibrations. Operators of work vehicles typically work long hours increasing their susceptibility to discomfort and fatigue from a rough ride quality. Rubber mounts and air cushion isolators have been used with the operator's station to increase operator comfort. However, improvements are desired to further address the inputs that result from the complex motion of a typical work vehicle.

SUMMARY OF THE DISCLOSURE

A suspension system for a work vehicle cab is disclosed that controls multiple degrees of freedom of the cab.

According to one aspect of the disclosure, a number of mounting pads support the cab with a spring assembly connected between the chassis structure of the vehicle and each of the mounting pads. The spring assemblies allow the cab to move with multiple degrees of freedom. A lateral rod connects with one of the mounting pads, with the chassis structure outboard from one of the spring assemblies, and restricts side-to-side motion of the cab. A longitudinal rod connects with one of the mounting pads, with the chassis structure rearward from one of the spring assemblies, and restricts front-to-back motion of the cab. A stabilizer bar may connect with one of the front mounting pads, one of the rear mounting pads, the chassis structure, and may control forward and rearward pitch rate of the cab. A roll control bar may connect with the rear left mounting pad, with the rear right mounting pad, with the chassis structure, and may control left and right roll rate of the cab.

In other aspects, a suspension system includes front left, front right, rear left, and rear right mounting pads that provide four-point support of the cab. Brackets correspond to, and connect with, each of the mounting pads. A spring and damper assembly is connected between the vehicle's chassis structure and each one of the brackets, allowing the cab to move with multiple degrees of freedom. A front lateral rod connects with either the front right bracket or the front left bracket, extends laterally across the cab, and connects with the chassis structure outboard from the other front bracket, restricting side-to-side motion of the cab. A longitudinal rod connects with one of the front brackets, extends past one of the rear spring and damper assemblies, and connects with the chassis structure rearward from the spring and damper assembly, restricting front-to-back motion of the cab. A stabilizer bar may connect with the front right bracket, the rear right bracket, and the chassis structure, maintaining a prescribed forward and rearward pitch rate of the cab. A roll control bar may connect with the rear left bracket, the rear right bracket, and the chassis structure, maintaining a prescribed left and right roll rate of the cab.

In additional aspects, front left, front right, rear left, and rear right mounting pads support the cab. Brackets correspond to, and connect with, each of the mounting pads. A spring and damper assembly is connected between the vehicle's chassis structure and each one of the brackets, allowing the cab to move with multiple degrees of freedom. A structural member extends between, and connects with, the front left and front right brackets. Another structural member extends between, and connects with, the rear left and rear right brackets. A front lateral rod connects with the front right bracket, extends laterally across the cab, and connects with the chassis structure outboard from the front left spring over damper assembly, restricting side-to-side motion of the cab. A rear lateral rod connects with the rear right bracket, extends past the rear left spring over damper assembly, and connects with the chassis structure outboard from the rear left spring over damper assembly, restricting side-to-side motion of the cab. A left longitudinal rod connects with the front left bracket, extends past the rear left spring and damper assembly, and connects with the chassis structure rearward from the left spring and damper assembly, restricting front-to-back motion of the cab. A right longitudinal rod connects with the front right bracket, extends past the rear right spring over damper assembly, and connects with the chassis structure rearward from the rear right spring over damper assembly, restricting the front-to-back motion of the cab. A stabilizer bar connects with the front right bracket, the rear right bracket, and the chassis structure, maintaining a prescribed forward and rearward pitch rate of the cab. A roll control bar connects with the rear left bracket, the rear right bracket, and the chassis structure, maintaining a prescribed left and right roll rate of the cab.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed suspension systems for the cab of a work vehicle as shown in the accompanying figures of the drawings described briefly above. Various modifications to the example embodiments may be contemplated by one of skill in the art.

In one or more example implementations of the disclosed system, mounting pads support the cab of a work vehicle, with supporting assemblies such as spring over damper assemblies, which allow the cab to move with multiple degrees of freedom (MDOF). The supporting assemblies allow movement of the cab relative to the vehicle's chassis structure, and provide damping to control oscillation of the springs and to dissipate energy. A combination of as many as six links between the cab and chassis control MDOF movement of the cab, and may include four panhard rods, a pitch control bar and a roll control bar. The linkage length and the number of linkages provides low linkage movement and low forces allowing for the use of softer bushings with lower spring rates, providing better isolation of the cab and reducing noise transfer to the operator.

Example environments in which a suspension system for MDOF control may be implemented include work vehicles and other vehicles that have a suspended cab structure. Example work vehicles include a tractor, loader, excavator, harvester, truck, dozer, skid steer, and other vehicles for off-road uses, including those used in the construction, agriculture, or forestry industries. Other vehicles include passenger vehicles, trucks, other on-road vehicles, recreation vehicles, tow-vehicles, and load carrying vehicles.

The following description relates to suspension systems in the context of certain work vehicle applications for purposes of demonstrating examples. The present disclosure is not limited to any particular vehicle applications, or to use with any particular supporting assemblies, but rather also encompasses any application where suspension is required for an operator station that moves with MDOF. Accordingly, the teachings of the present disclosure may be applied to suspension systems in a variety of applications, including in work vehicle cab support systems, when desired.

Figure 1:
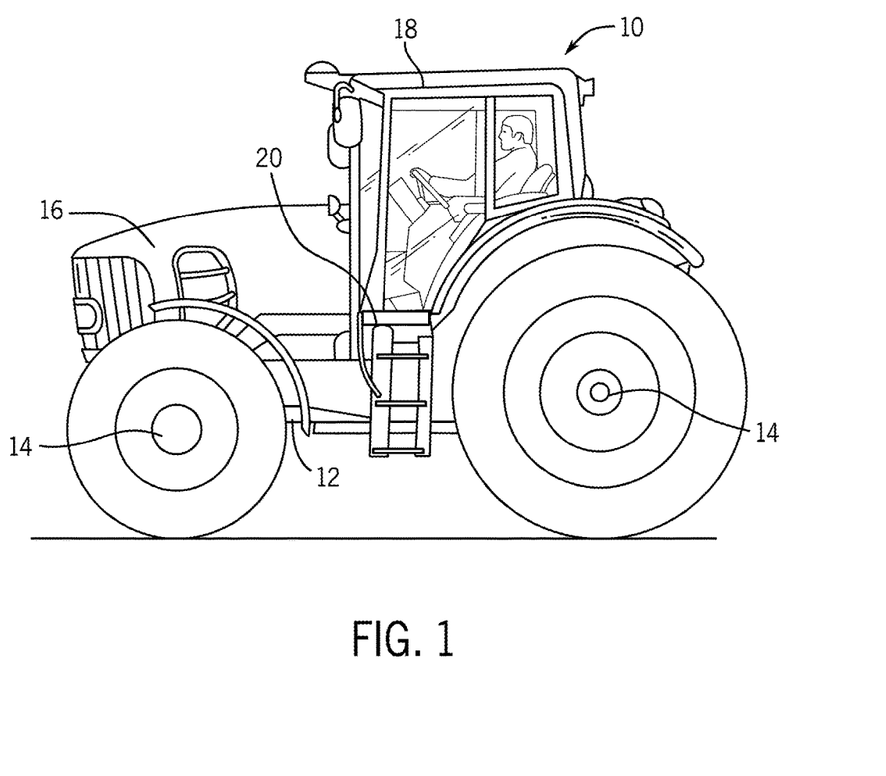
FIG. 1 is a side view of an example work vehicle in the form of an agricultural tractor in which the disclosed suspension system may be used.

As noted above, the disclosed suspension system described herein may be employed in a variety of applications. Referring to FIG. 1, one example involves a suspension system that may be included in a work vehicle 10, which in this example is depicted as an agricultural tractor. It will be understood, however, that other configurations are contemplated, including configurations with work vehicle 10 as a different kind of tractor, or as a work vehicle used for other aspects of the agriculture industry or for the construction or forestry industries (e.g., a harvester, a log skidder, motor grader, and so on). It will further be understood that the disclosed suspension system may also be used in non-work vehicles, non-vehicle applications, and with other types of equipment and machines where a suspension system for MDOF control is useful. In the current example, the work vehicle 10 has a frame or chassis structure 12 supported by wheels 14 that engage the ground. Two or four of the wheels 14 may be powered for propelling the work vehicle 10 and at least the front wheels 14 are steerable to control the direction of travel. The chassis structure 12 supports a power plant in the form of an internal combustion engine 16. A powertrain transmission (not shown), connects the engine 16 with the wheels 14 to provide different speed ratios for varying operating conditions. A cab 18 is provided in which operator interface and control means (e.g., various controls wheels, levers, switches, buttons, screens, keyboards, etc.), are stationed. The controls and other equipment available in the cab 18 for the operator and for other functions may include sophisticated electronics and other sensitive equipment. Accordingly, for operator comfort, for maintaining equipment interfaces and operation, and to preserve the integrity of various controls and systems, motion control of the cab 18 is important. To effectively control motion of the cab 18, the work vehicle 10 includes a suspension system 20 that supports the cab 18 on the chassis structure.

Figure 2:
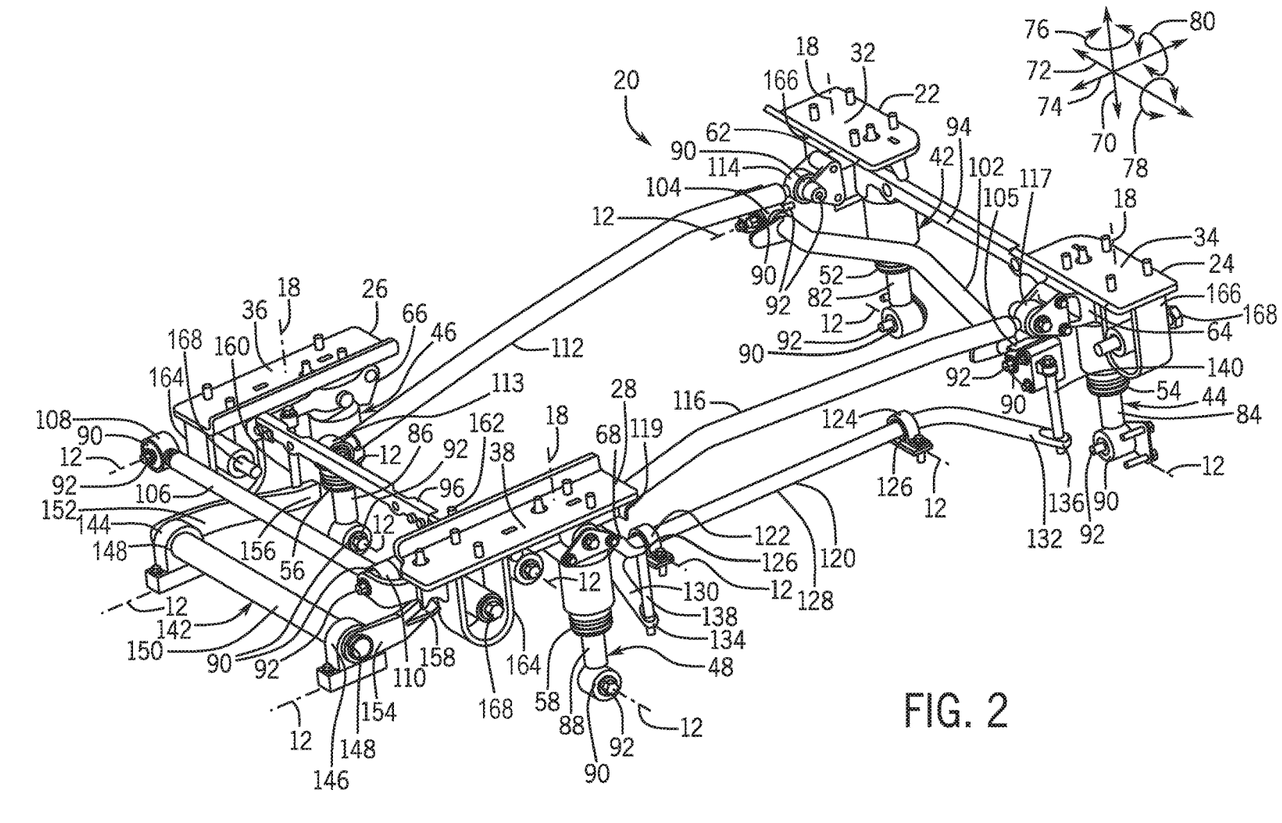
FIG. 2 is a perspective view of a suspension system with multiple degrees of freedom for the work vehicle of FIG. 1.
Figure 3:
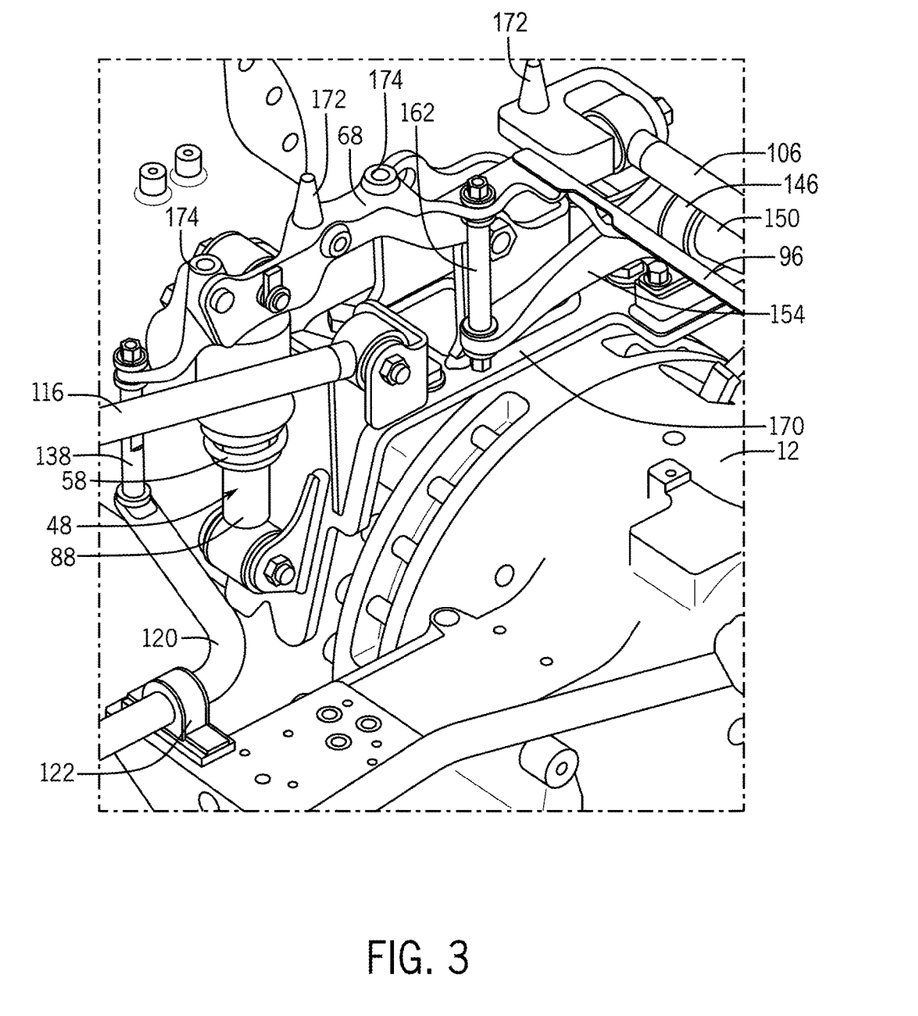
FIG. 3 is a partial perspective view of a corner assembly of the suspension system of FIG. 2.

In an example as illustrated in FIGS. 2 and 3, the suspension system 20 includes a number of mounting pads that connect with and support the cab 18. This includes a front left mounting pad 22, a front right mounting pad 24, a rear left mounting pad 26, and a rear right mounting pad 28. In the current example, the mounting pads 22-28 are formed as weldments as further described below. The mounting pads 22-28 are spaced apart so as to be disposed in the vicinity of the four corners of the cab 18. Preferably, the mounting pads 22-28 are spaced away from each other to the greatest extent possible given the physical size of the cab 18. The mounting pads 22, 24, 26, 28 each includes an area that is flat, formed by a plate 32, 34, 36, 38 respectively. The plates are flat, or substantially flat, to interface with the cab 18, but may take other shapes in other applications. In this example, the plates 32-38 are disposed horizontally and lie at an elevation in a common plane. In other examples, the mounting pads 22-28 may be at various heights, however substantial differences in height will generally be avoided to accommodate the suspension system 20.

The suspension system 20 includes supporting assemblies with springs and dampers in the form of spring over damper assemblies 42, 44, 46 and 48, each of which is connected between the chassis structure 12 and a respective mounting pad 22-28. In other embodiments, the supporting assemblies may take other forms, such as separate springs and dampers, or other elements that allow MDOF movement. In this example, each spring over damper assembly 42-48 includes a spring 52, 54, 56, 58 respectively, which allows the cab 18 to move with MDOF action. The springs 52-58 are coil springs with gaps between adjacent coils that compress when subjected to force caused by movement of the chassis structure 12 relative to the mass of the cab 18. Compression or extension of the coils stores energy and reduces the amount the cab 18 must move as compared to the triggering movements of the chassis structure 12. In particular, and without considering other constraints that are described below, the cab 18 may: move up and down 70; move left and right 72; move forward and rearward 74; swivel or yaw 76; pitch 78 fore and aft; roll 80 side-to-side, or move in any combination of those movements. Control of the complex motions through which the cab 18 may travel relative to the chassis structure 12, is effected through the suspension system 20.

In this example, each spring over damper assembly 42-48 is connected with its respective mounting pad 22-28 through a bracket 62, 64, 66, 68. The brackets 62-68 each serve as a connection system at their respective corner of the suspension system 20. Each spring over damper assembly 42-48 includes a damper 82, 84, 86, 88 extending through its respective spring 52-58. The dampers 82-88 control oscillation of the springs 52-58 and dissipate energy. The coil spring over damper type construction has the benefit of a compact package for fitting within the suspension system 20.

The dampers 82-88 are each connected with the chassis structure 12 through a respective pin 92 that passes through a resilient bushing 90, which engages the respective damper 82-88. Movement of the cab 18 relative to the chassis structure 12 oscillates the springs 52-58, strokes the dampers 82-88, and also compresses and decompresses the bushings 90. The bushings 90, and other bushings at various connecting points or joints in the suspension system 20, absorb shock, control the amount of movement at the joints, and reduce noise and vibrations. The various bushings such as the bushings 90, have an inherent resiliency that allows some movement in a joint as the material compresses and decompressed. The material of the bushings 90, and other bushings in the suspension system 20, has a spring rate selected to withstand the incurred forces that apply the compressive and decompressive actions. Accordingly, a material with a higher spring rate (and greater stiffness), is selected when loads are higher. However, the bushings 90 also serve an isolation function for the transmission of vibrations and noise from the chassis structure 12 to the cab 18. For greater isolation, a lower spring rate is desirable. Due to the configuration of the suspension system 20 as further detailed herein, features such as linkage lengths and the number of linkages, result in less joint movement and lower resulting forces. Accordingly, bushings, including the bushings 90 may be made of a material that has a lower spring rate and therefore, better attenuates the transmission of noise and vibration to the cab 18 and the operator and equipment contained therein.

As shown in FIG. 2, the front left and front right mounting pads 22, 24 are connected by a structural member 94 that extends between, and is connected with, the mounting pads 22, 24 at the front left bracket 62 and the front right bracket 64. The structural member 94 sets the spacing between the mounting pads 22, 24 during assembly, and provides rigidity across the front of the cab 18 when left in place. Similarly, the rear left and rear right mounting pads 26, 28 are connected by a structural member 96 that extends between, and is connected with, the mounting pads 26, 28 at the rear left bracket 66 and the rear right bracket 68. The structural members 94, 96 are rigidly connected with the brackets 62, 64 and 66, 68, respectively. Accordingly, lateral movement of the mounting pad 22 relative to the mounting pad 24 or of the rear left mounting pad 26 relative to the mounting pad 28 is inhibited to assist in assembly of the suspension system 20. In some examples, the structural members 94, 96 are used for locating purposes during assembly and removed when assembly is complete.

In the suspension system 20, a lateral rod 102 connects with the front right mounting pad 24 at the front right bracket 64. This front lateral rod 102 extends laterally across the front area of the cab 18 from the bracket 64, past the front left spring over damper assembly 42, and connects with the chassis structure 12 outboard from the front left spring over damper assembly 42, and from the bracket 62. The front lateral rod 102 restricts side-to-side motion (movement left and right 72), of the cab 18. Each end of the front lateral rod 102 includes an eyelet that contains a bushing 90 through which a pin 92 extends, connecting the left end 104 to the chassis structure 12 and the right end 105 to the bracket 64. Due to the connection points, the length of the front lateral rod 102 is maximized, minimizing the load on the bushings 90 so that they may be made of a material with a lower spring rate for better isolation as described above. The front lateral rod 102 pivots about its left end 104 as the cab 18 moves up and down 70, limiting movement left and right 72.

Another lateral rod 106 connects with the rear right mounting pad 28 at the rear right bracket 68. This rear lateral rod 106 extends laterally across the rear area of the cab 18 from the bracket 68, past the rear left spring over damper assembly 46, and connects with the chassis structure 12 outboard from the rear left spring over damper assembly 46, and from the bracket 66. The rear lateral rod 106 restricts side-to-side motion (movement left and right 72), of the cab 18. Each end of the rear lateral rod 106 includes an eyelet that contains a bushing 90 through which a pin 92 extends, connecting the left end 108 to the chassis structure 12 and the right end 110 to the bracket 68. The length of the rear lateral rod 106 is maximized, reducing the load on the bushings 90 so that they may be made of a material with a lower spring rate providing better isolation as described above. The rear lateral rod 106 pivots about its left end 108 as the cab 18 moves up and down 70, limiting movement left and right 72. The lateral rods 102, 106 position the cab 18 in the lateral direction (left and right 72), relative to the chassis structure 12.

A longitudinal rod 112 connects with the front left mounting pad 22 at the bracket 62. The left longitudinal rod 112 extends rearward longitudinally across the left area of the cab 18, from the bracket 62, past the rear left spring over damper assembly 46, and connects with the chassis structure 12 rearward from the rear left spring over damper assembly 46. The left longitudinal rod 112 restricts front-to-back motion (movement forward and rearward 74), of the cab 18. Each end of the left longitudinal rod 112 includes an eyelet that contains a bushing 90 through which a pin 92 extends, connecting the front end 114 to the bracket 62 and the rear end 113 to the chassis structure 12. By connecting with the chassis structure 12 behind the rear left spring over damper assembly 46, the length of the left longitudinal rod 112 is maximized, reducing the load on the bushings 90 so that they may be made of a material with a lower spring rate for better isolation as described above. The left longitudinal rod 112 pivots about its front end 114 as the cab 18 moves up and down 70, limiting movement forward and rearward 74.

Another longitudinal rod 116 connects with the front right mounting pad 24 at the bracket 64. The right longitudinal rod 116 extends longitudinally across the right area of the cab 18, rearward from the bracket 64, past the rear right spring over damper assembly 48, and connects with the chassis structure 12 rearward from the rear right spring over damper assembly 48. The right longitudinal rod 116 restricts front-to-back motion (movement forward and rearward 74), of the cab 18. Each end of the right longitudinal rod 116 includes an eyelet that contains a bushing 90 through which a pin 92 extends, connecting the front end 117 to the bracket 62 and the rear end 119 to the chassis structure 12. By connecting with the chassis structure 12 behind the rear right spring over damper assembly 48, the length of the right longitudinal rod 116 is maximized, reducing the load on the bushings 90 so that they may be made of a material with a lower spring rate for better isolation as described above. The right longitudinal rod 116 pivots about its front end 117 as the cab 18 moves up and down 70, limiting movement forward and rearward 74. The longitudinal rods 112, 116 position the cab 18 in the longitudinal direction (forward and rearward 74), relative to the chassis structure 12.

A stabilizer bar 120 connects with the front right mounting pad 24 at the bracket 64, and with the rear right mounting pad 28 at the bracket 68. The stabilizer bar 120 also connects with the chassis structure 12 at two locations via retainers 122, 124 that contain bushings 126, through which the stabilizer bar 120 extends. The stabilizer bar 120 includes a segment 128 that extends longitudinally and connects with the chassis structure 12 by the retainers 122, 124. Two segments 130, 132, extend laterally from the segment 128 to ends 134, 136, respectively. The end 134 is connected with the rear right mounting pad 28 through a connecting rod 138 that connects at the bracket 64. The end 136 is connected with the front right mounting pad 24 through a connecting rod 140 that connects at the bracket 62. The stabilizer bar 120 provides pitch 78 control to maintain a prescribed forward and rearward 74 pitch rate of the cab 18. The segments 130, 132 operate as lever arms and twist the segment 128 as the body pitches 78. The segment 28 has a selected amount of resistance to twisting to reduce the rate and magnitude of pitching action.

A roll control bar 142 connects with the rear left mounting pad 26 at the bracket 66, and with the rear right mounting pad 28 at the bracket 68. The roll control bar 142 also connects with the chassis structure 12 at two locations via retainers 144, 146 that contain bushings 148, through which the roll control bar 142 extends. The roll control bar 142 includes a bar 150 that extends laterally and connects with the chassis structure 12 via the retainers 144, 146. Two arms 152, 154, connect with the bar 150 and extend longitudinally to ends 156, 158, respectively. The end 156 is connected with the rear left mounting pad 26 through a connecting rod 160 that connects at the bracket 66. The end 158 is connected with the rear right mounting pad 28 through a connecting rod 162 that connects at the bracket 68. The roll control bar 142 provides roll 80 control to maintain a prescribed left and right roll rate of the cab 18. The arms 152, 154 operate as lever arms and twist the bar 150 as the body rolls 80. The bar 150 has a selected amount of resistance to twisting to reduce the rate and magnitude of rolling action.

In this example, the plates 36, 38 are each connected with a stop member 164 that projects downward in a U-shape. The stop members 164 are disposed longitudinally and provide end stops when travel of the suspension system 20 on its supporting assemblies reaches full compression or rebound. Similarly, the plates 32, 34 are each connected with stop members 166 that project downward in a U-shape. The stop members 166 are disposed laterally and provide end stops when travel of the suspension system 20 on its supporting assemblies reaches full compression or rebound. A bumper assembly 168 is disposed within the U-shaped portion of the stop members 164, 166 for connecting with the chassis structure 12 during assembly. The bumper assemblies 168 contact the stop members 164, 166 to reduce impact forces as movement approaches travel end stop.

With reference to FIG. 3, the corner of the suspension system 20 at the rear right mounting pad 28 is shown from the perspective of a point inside the work vehicle 10 looking outward, with the mounting pad 28 removed for visibility of other components. The bracket 68 is visible and extends from the connection with the connecting rod 138 to the connection with the rear lateral rod 106. In addition, the structural member 96, the connecting rod 162, and the spring over damper assembly 48 are shown connected directly to the bracket 68. The bracket 68 includes locator pins 172, which extend upward and provide guidance for interfacing with the plate 38 during assembly. Another bracket 170 is connected with the chassis structure 12 at the rear axle housing structure, and provides the mounting interface of the chassis structure 12 with the spring over damper assembly 48, the retainer 146 and the longitudinal rod 116.

Figure 4:
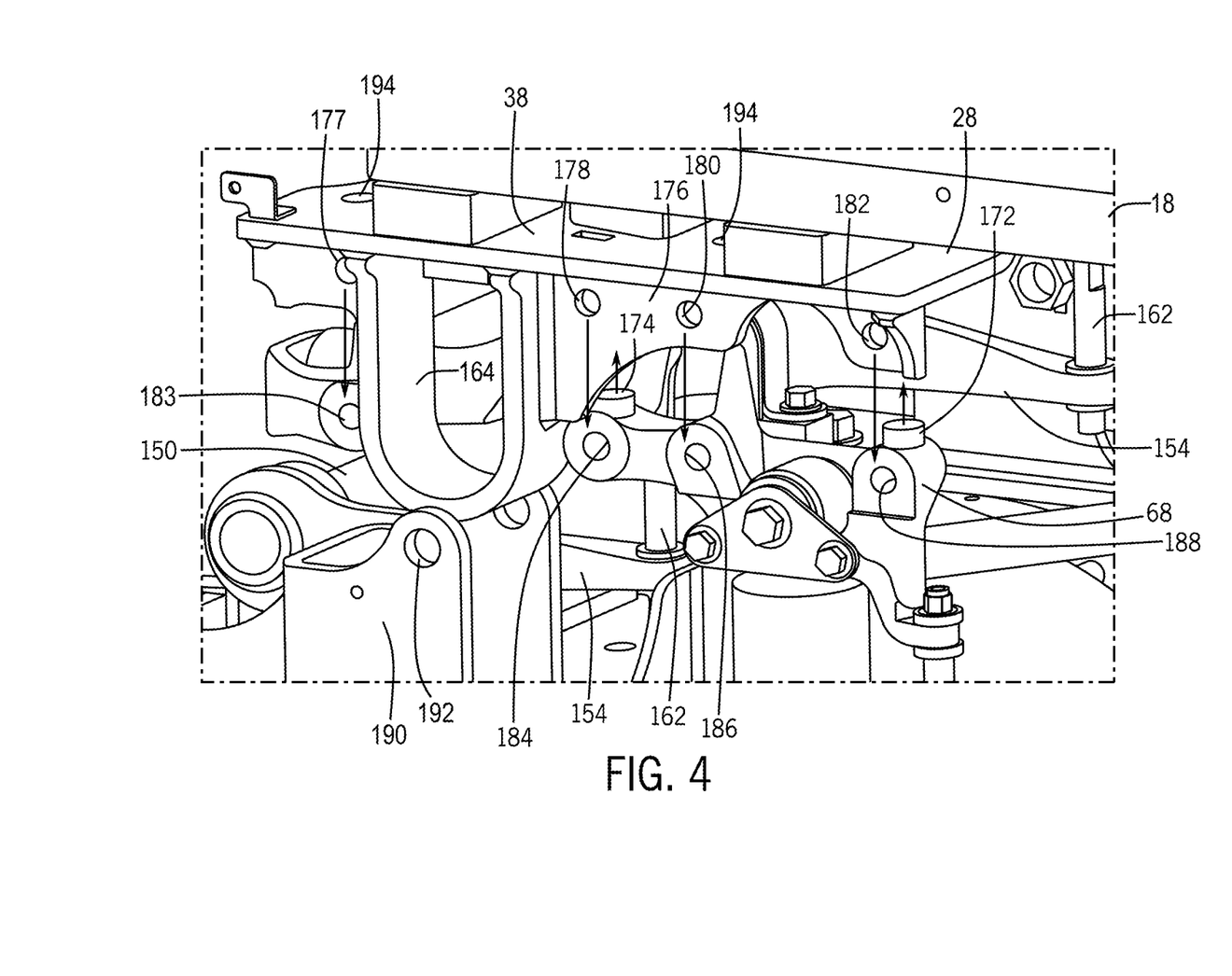
FIG. 4 is a partial perspective view of the corner assembly of FIG. 3, shown in an assembly process.

Referring to FIG. 4, assembly of the mounting pad 28 with the cab 18 is illustrated. The mounting pad 28 is in the form of multiple components welded together in an assembly, including the plate 38, a plate 176 and the stop member 164. As the cab 18 with the mounting pad 28 is lowered onto the suspension system 20, holes 177, 178, 180, 182 in the plate 176 align with holes 183, 184, 186, 188 respectively, in the bracket 68 for connection purposes such as with bolts (shown in FIG. 2). The stop member 164 is received within a block 190 with an opening 192 that receives the bumper assembly 168. Locator pins 172 on the bracket 68 mate with openings 194 in the plate 38 for alignment purposes. Stops 174 project from the bracket 68, which contact the plate 38 during assembly and support the cab 18 in operation.

Through the examples described above, a suspension system for MDOF control is provided. A number of mounting pads support the cab with a spring assembly connected between the chassis structure of the vehicle and each of the mounting pads. The spring assemblies allow the cab to move with MDOF. A lateral rod connects with one of the mounting pads, with the chassis structure outboard from one of the spring assemblies, and restricts side-to-side motion of the cab. A longitudinal rod connects with one of the mounting pads, with the chassis structure rearward from one of the spring assemblies, and restricts front-to-back motion of the cab. A stabilizer bar may connect with one of the front mounting pads, one of the rear mounting pads, the chassis structure, and may control forward and rearward pitch rate of the cab. A roll control bar may connect with the rear left mounting pad, with the rear right mounting pad, with the chassis structure, and may control left and right roll rate of the cab.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A suspension system for controlling multiple degrees of freedom of a cab of a vehicle with a chassis structure, the suspension system comprising:
    front left, front right, rear left, and rear right mounting pads configured to support the cab;
    a spring assembly connected between the chassis structure and each one of the mounting pads, the spring assemblies configured to allow the cab to move with multiple degrees of freedom;
    a lateral rod connected with one of the mounting pads, extending laterally across the cab, and connected with the chassis structure outboard from one of the spring assemblies, the lateral rod configured to restrict a side-to-side motion of the cab;
    a longitudinal rod connected with one of the mounting pads, extending longitudinally across the cab, and connected with the chassis structure rearward from one of the spring assemblies, the longitudinal rod configured to restrict a front-to-back motion of the cab;
    a stabilizer bar connected with one of the front mounting pads, one of the rear mounting pads, and the chassis structure, the stabilizer bar configured to maintain a prescribed forward and rearward pitch rate of the cab; and a bracket connected with one of the mounting pads, the bracket connected directly with one of the spring assemblies, with the lateral rod and with the longitudinal rod.

2. The system of claim 1 comprising a roll control bar connected with the rear left mounting pad, the rear right mounting pad and the chassis structure, the roll bar configured to maintain a prescribed left and right roll rate of the cab.

3. The system of claim 1 comprising:
a second lateral rod connected with one of the mounting pads, extending laterally across the cab, and connected with the chassis structure outboard from one of the spring assemblies, the second lateral rod configured to restrict the side-to-side motion of the cab; and
a second longitudinal rod connected with one of the mounting pads, extending longitudinally across the cab, and connected with the chassis structure rearward from one of the spring assemblies, the longitudinal rod configured to restrict the front-to-back motion of the cab.

4. The system of claim 1, wherein the stabilizer bar is connected directly to the bracket.

5. The system of claim 4, comprising a second bracket connected with another one of the mounting pads, the second bracket connected with the roll control bar.

6. The system of claim 1, comprising a structural member extending between, and connected with, the front left and front right mounting pads.

7. The system of claim 6, comprising a second structural member extending between, and connected with, the rear left and rear right mounting pads.

8. The system of claim 1 comprising a bracket connected with each one of the mounting pads and with each one of the spring assemblies.

9. The system of claim 1 comprising a damper connected in each one of the spring assemblies, the dampers configured to dampen motion of the cab and to dissipate energy stored in the springs.

10. The system of claim 1 wherein the stabilizer bar comprises a longitudinally extending segment and two laterally extending segments, and comprising a connecting rod connecting each of the laterally extending segments with a separate one of the mounting pads.

11. The system of claim 1 wherein the roll control bar comprises a laterally extending bar connected with two longitudinally extending arms, and comprising a connecting rod connecting each of the longitudinally extending arms with a separate one of the mounting pads.

12. The system of claim 1 wherein the vehicle comprises an agricultural tractor.

13. A suspension system for controlling multiple degrees of freedom of a cab of a vehicle with a chassis structure, the suspension system comprising:
front left, front right, rear left, and rear right mounting pads configured to support the cab;
front left, front right, rear left, and rear right brackets, each of which is connected with a corresponding one of the mounting pads;
a spring and damper assembly connected between the chassis structure and each one of the brackets, the spring and damper assemblies configured to allow the cab to move with multiple degrees of freedom;

a front lateral rod connected with one of the front right bracket or the front left bracket, extending laterally across the cab, and connected with the chassis structure outboard from the other one of the front right bracket or the front left bracket, the front lateral rod configured to restrict a side-to-side motion of the cab;
a longitudinal rod connected with one of the front left bracket or the front right bracket, extending past one of the rear spring and damper assemblies, and connected with the chassis structure rearward from the one of the spring and damper assemblies, the longitudinal rod configured to restrict a front-to-back motion of the cab;
a stabilizer bar connected with the front right bracket, the rear right bracket, and the chassis structure, the stabilizer bar configured to maintain a prescribed forward and rearward pitch rate of the cab; and
a roll control bar connected with the rear left bracket, the rear right bracket and the chassis structure, and configured to maintain a prescribed left and right roll rate of the cab.

14. The system of claim 13, comprising a rear lateral rod connected with the rear right bracket, extending past the rear left spring and damper assembly, and connected with the chassis structure outboard from the rear left spring and damper assembly, the rear lateral rod configured to restrict the side-to-side motion of the cab.

15. The system of claim 13, comprising another longitudinal rod connected with another of the front left bracket or front right bracket, extending past another of the rear spring and damper assemblies, and connected with the chassis structure rearward from the another rear spring and damper assembly, the another longitudinal rod configured to restrict the front-to-back motion of the cab.

16. The system of claim 13, comprising a structural member extending between, and connected with, the front left and front right brackets.

17. The system of claim 16, comprising a second structural member extending between, and connected with, the rear left and rear right brackets.

18. The system of claim 13, comprising bushings disposed between each of:
the spring and damper assemblies and their respective brackets;
the front lateral rod and the bracket to which it is connected;
the left longitudinal rod and the bracket to which it is connected;
the stabilizer bar and the bracket to which it is connected; and
the roll control bar and the bracket to which it is connected.

19. A suspension system for controlling multiple degrees of freedom of a cab of a vehicle with a chassis structure, the suspension system comprising:
front left, front right, rear left, and rear right mounting pads configured to support the cab;
front left, front right, rear left, and rear right brackets, each of which is connected with a corresponding one of the mounting pads;
a spring over damper assembly connected between the chassis structure and each one of the brackets, the spring over damper assemblies configured to allow the cab to move with multiple degrees of freedom;
a first structural member extending between, and connected with, the front left and front right brackets;
a second structural member extending between, and connected with, the rear left and rear right brackets;

a front lateral rod connected with the front right bracket, extending past the front left spring over damper assembly, and connected with the chassis structure outboard from the front left spring over damper assembly, the front lateral rod configured to restrict a side-to-side motion of the cab;

a rear lateral rod connected with the rear right bracket, extending past the rear left spring over damper assembly, and connected with the chassis structure outboard from the rear left spring over damper assembly, the rear lateral rod configured to restrict the side-to-side motion of the cab;

a left longitudinal rod connected with the front left bracket, extending past the rear left spring over damper assembly, and connected with the chassis structure rearward from the rear left spring over damper assembly, the left longitudinal rod configured to restrict a front-to-back motion of the cab;

a right longitudinal rod connected with the front right bracket, extending past the rear right spring over damper assembly, and connected with the chassis structure rearward from the rear right spring over damper assembly, the right longitudinal rod configured to restrict the front-to-back motion of the cab;

a stabilizer bar connected with the front right bracket, the rear right bracket, and the chassis structure, the stabilizer bar configured to maintain a prescribed forward and rearward pitch rate of the cab; and a roll control bar connected with the rear left bracket, the rear right bracket and the chassis structure, the roll control bar configured to maintain a prescribed left and right roll rate of the cab.

* * * * *